United States Patent
Yu et al.

(10) Patent No.: US 12,301,505 B2
(45) Date of Patent: *May 13, 2025

(54) SIGNAL FIELD INDICATION METHOD AND APPARATUS

(71) Applicant: Huawei Technologies Co., Ltd., Shenzhen (CN)

(72) Inventors: Jian Yu, Shenzhen (CN); Oded Redlich, Hod Hasharon (IL); Leonid Epstein, Hod Hasharon (IL); Shimon Shilo, Hod Hasharon (IL); Genadiy Tsodik, Hod Hasharon (IL); Yanchun Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,311

(22) Filed: May 8, 2024

(65) Prior Publication Data

US 2024/0291618 A1    Aug. 29, 2024

Related U.S. Application Data

(63) Continuation of application No. 17/144,476, filed on Jan. 8, 2021, now Pat. No. 12,003,454, which is a (Continued)

(30) Foreign Application Priority Data

Jul. 9, 2018 (CN) .......................... 201810746392.4

(51) Int. Cl.
*H04L 5/00* (2006.01)
*H04W 80/02* (2009.01)
*H04W 84/12* (2009.01)

(52) U.S. Cl.
CPC ........... *H04L 5/0053* (2013.01); *H04W 80/02* (2013.01); *H04W 84/12* (2013.01)

(58) Field of Classification Search
CPC ..... H04L 69/323; H04L 5/0053; H04L 5/006; H04L 5/0091; H04L 5/0005; H04L 5/0044; H04W 80/02; H04W 84/12
See application file for complete search history.

(56) References Cited

U.S. PATENT DOCUMENTS

| 2005/0152357 A1 | 7/2005 | Stephens |
| 2015/0304077 A1 | 10/2015 | Cao et al. |

(Continued)

FOREIGN PATENT DOCUMENTS

| CN | 103916178 A | 7/2014 |
| CN | 104363192 A | 2/2015 |

(Continued)

OTHER PUBLICATIONS

Choi Jinsoo et al: "View on EHT Objectives and Technologies", IEEE Draft 802.11-18/1171r0, IEEE-SA Mentor, Piscataway, NJ USA, Jul. 8, 2018 (Jul. 8, 2018), pp. 1-13, XP068128253, 13 pages.
(Continued)

*Primary Examiner* — Ji-Hae Yea
(74) *Attorney, Agent, or Firm* — Slater Matsil, LLP

(57) ABSTRACT

A signal field indication method and apparatus are provided. The method includes: generating, by a transmit end, a PPDU, where the PPDU includes a SIG-A indication field, and the SIG-A indication field includes at least one of a field used to indicate a number of SIG-A information symbols and a field used to indicate a SIG-A information bandwidth; and sending, by the transmit end, the PPDU. According to the method provided in this application, the transmit end may indicate different numbers of SIG-A information symbols and/or different SIG-A information bandwidths.

20 Claims, 15 Drawing Sheets

Related U.S. Application Data continuation of application No. PCT/CN2019/076921, filed on Mar. 5, 2019.

(56) References Cited

U.S. PATENT DOCUMENTS

| | | |
|---|---|---|
| 2016/0119452 A1 | 4/2016 | Lee |
| 2016/0242177 A1 | 8/2016 | Seok |
| 2016/0374017 A1 | 12/2016 | Stacey et al. |
| 2017/0047971 A1 | 2/2017 | Seok |
| 2017/0367096 A1 | 12/2017 | Park et al. |
| 2018/0007661 A1 | 1/2018 | Chun et al. |
| 2018/0041990 A1 | 2/2018 | Venkatesan et al. |
| 2019/0373586 A1* | 12/2019 | Verma .................. H04W 72/51 |

FOREIGN PATENT DOCUMENTS

| | | |
|---|---|---|
| CN | 106100791 A | 11/2016 |
| CN | 106464961 A | 2/2017 |
| CN | 106576020 A | 4/2017 |
| CN | 107113141 A | 8/2017 |
| CN | 107251472 A | 10/2017 |
| CN | 107079020 B | 4/2020 |
| CN | 107534534 B | 9/2020 |
| KR | 20090072992 A | 9/2009 |
| WO | 2015192308 A1 | 12/2015 |
| WO | 2016029874 A1 | 3/2016 |
| WO | 2016068413 A1 | 5/2016 |
| WO | 2016133371 A1 | 8/2016 |
| WO | 2016178474 A1 | 11/2016 |
| WO | 2017011274 A1 | 1/2017 |
| WO | 2017018615 A1 | 2/2017 |
| WO | 2017079549 A1 | 5/2017 |
| WO | 2017120418 A1 | 7/2017 |

OTHER PUBLICATIONS

Deng, Der-Jiunn et al., "Highly Efficient WLANs for Intelligent Information Infrastructure", IEEE 802.11ax, IEEE Communications Magazine, Dec. 2017, 8 pages, vol. 55, Issue 12.

HTC, "UE radio access capability for WLAN", 3GPP TSG-RAN2#91bis meeting Tdoc R2-154369, Malmo, Sweden, Oct. 5-9, 2015, 7 pages.

Huawei et al., "TP for 36.789: On the need for inclusion of future Wi-Fi system", 3GPP TSG-RAN WG4 Meeting #82, R4-1701227, Athens, Greece, Feb. 13-17, 2017, 2 pages.

R1-1806544, Intel Corporation, Potential designs for NR unlicensed channel access mechanism, 3GPP TSG RAN WG1 Meeting #93, Busan, Korea, May 21-25, 2018, 8 pages.

Porat, Ron et al., "Autodetection with Signature Symbol", IEEE 802.11-15/0643, May 11, 2015, 9 pages.

R5-085325, Rohde and Schwarz, Batch 1A—Update of E-UTRA RLC (AM) test cases 7.2.3.5, 7.2.3.6, 7.2.3.7, 7.2.3.8, 7.2.3.13 (Batch 2) and 7.2.3.14, 3GPP TSG RAN WG5 Meeting #41, Prague, Czech Republic, Nov. 10-14, 2008, 27 pages.

Usai, Paolo, Secretary TSG GERAN, "Draft Report of TSG GERAN meeting #66, version 0.0.1", Technical Specification Group GERAN, Draft report, Meeting #66, Vilnius, Lithuania, May 25-29, 2015, 182 pages.

Zhang Haoyue et al, "Implementation of ultra-high-speed WLAN prototype based on NIPXI", China Science and Technology Core Journal, Feb. 2016, with an English Abstract, 7 pages.

Ma Chunli, "Research on New Generation of Ultra High Speed Energy Efficiency Transmission Techniques", School of Information Science and Engineering Southeast University, May 2016, with English abstract total 96 pages.

* cited by examiner

| Preamble | | | |
|---|---|---|---|
| Short training field STF | Long training field LTF | Signal field SIG | Data Data |

Quantity of symbols:  2    2    1    1 to N

FIG. 1

| Legacy short training field L-STF | Legacy long training field L-LTF | Legacy signal field L-SIG | Very high throughput signal field A VHT-SIG-A | Very high throughput short training field VHT-STF | Very high throughput long training field VHT-LTF | Very high throughput signal field B VHT-SIG-B | Data Data |
|---|---|---|---|---|---|---|---|
| Quantity of symbols: 2 | 2 | 1 | 2 | 1 | 1 to 8 | 1 | 1 to N |

FIG. 3

| SU | Legacy short training field L-STF | Legacy long training field L-LTF | Legacy signal field L-SIG | Repeated legacy signal field Repeated L-SIG (RL-SIG) | High efficient signal field A HE-SIG-A | High efficient short training field HE-STF | High efficient long training field HE-LTF | Data | Packet extension PE |
|---|---|---|---|---|---|---|---|---|---|
| Quantity of symbols: | 2 | 2 | 1 | 1 | 2 | 1 | 1 to 8 | 1 to N | |

| MU | Legacy short training field L-STF | Legacy long training field L-LTF | Legacy signal field L-SIG | Repeated legacy signal field Repeated L-SIG (RL-SIG) | High efficient signal field A HE-SIG-A | High efficient signal field B HE-SIG-B | High efficient short training field HE-STF | High efficient long training field HE-LTF | Data | Packet extension PE |
|---|---|---|---|---|---|---|---|---|---|---|
| Quantity of symbols: | 2 | 2 | 1 | 1 | 2 | 1 to M | 1 | 1 to 8 | 1 to N | |

| TB | Legacy short training field L-STF | Legacy long training field L-LTF | Legacy signal field L-SIG | Repeated legacy signal field Repeated L-SIG (RL-SIG) | High efficient signal field A HE-SIG-A | High efficient short training field HE-STF | High efficient long training field HE-LTF | Data | Packet extension PE |
|---|---|---|---|---|---|---|---|---|---|
| Quantity of symbols: | 2 | 2 | 1 | 1 | 2 | 1 | 1 to 8 | 1 to N | |

| ER SU | Legacy short training field L-STF | Legacy long training field L-LTF | Legacy signal field L-SIG | Repeated legacy signal field Repeated L-SIG (RL-SIG) | High efficient signal field A HE-SIG-A | High efficient short training field HE-STF | High efficient long training field HE-LTF | Data Data | Packet extension PE |
|---|---|---|---|---|---|---|---|---|---|
| Quantity of symbols: | 2 | 2 | 1 | 1 | 4 | 1 | 1 to 8 | 1 to N | |

FIG. 4

| L-STF | L-LTF | L-SIG | Symbol for automatic detection | EHT-SIG-A1 | EHT-SIG-A2 (Existent or non-existent) | EHT-SIG-A3 (Existent or non-existent) | ... |

FIG. 8

| L-STF | L-LTF | L-SIG | Symbol for automatic detection | EHT-SIG-A1 | EHT-SIG-A2 | ... |
|---|---|---|---|---|---|---|
| | | | | 20 MHz that is punctured | | |
| L-STF | L-LTF | L-SIG | Symbol for automatic detection | EHT-SIG-A1 | EHT-SIG-A2 | ... |
| L-STF | L-LTF | L-SIG | Symbol for automatic detection | EHT-SIG-A1 | EHT-SIG-A2 | ... | m=1

| L-STF | L-LTF | L-SIG | Symbol for automatic detection | EHT-SIG-A1 | EHT-SIG-A2 | ... |
|---|---|---|---|---|---|---|
| L-STF | L-LTF | L-SIG | Symbol for automatic detection | (40MHz) | Null or LTF subcarriers (Null or LTF tones) | ... |
| | | | | | (40MHz) | |
| L-STF | L-LTF | L-SIG | Symbol for automatic detection | EHT-SIG-A1 | EHT-SIG-A2 | ... |
| L-STF | L-LTF | L-SIG | Symbol for automatic detection | (40MHz) | Null or LTF subcarriers (Null or LTF tones) | ... |
| | | | | | (40MHz) | | m=2

FIG. 12

SIGNAL FIELD INDICATION METHOD AND APPARATUS

CROSS-REFERENCE TO RELATED APPLICATIONS

This application is a continuation of U.S. patent application Ser. No. 17/144,476, filed on Jan. 8, 2021, which is a continuation of International Application No. PCT/CN2019/076921, filed on Mar. 5, 2019, which claims priority to Chinese Patent Application No. 201810746392.4, filed on Jul. 9, 2018. All of the afore-mentioned patent applications are hereby incorporated by reference in their entireties.

TECHNICAL FIELD

This application relates to the field of wireless communications technologies, and in particular, to a signal field indication method and apparatus.

BACKGROUND

In a communications network, a signal is transmitted in a unit of a radio frame, and each radio frame includes one or more subframes.

Standards for a wireless local area network (WLAN) start from 802.11a/b/g and evolve from 802.11n and 802.11ac to and 802.11ax. In each standard, a physical layer protocol data unit (PPDU), which is referred to as a packet for short, has a structure that is divided into two parts: a preamble field and a data field.

In the preamble field, in each existing standard, information transmitted by using each of a high throughput signal (HT-SIG) field, a very high throughput signal-A (VHT-SIG-A) field, and a high efficient signal-A (HE-SIG-A) field occupy two symbols. In terms of frequency, the HT-SIG, the VHT-SIG-A, and the HE-SIG-A each use 20 MHz as a basic information unit, and independent encoding is performed in each 20 MHz frequency band. If a PPDU bandwidth exceeds 20 MHz, information is replicated on several 20 MHz frequency bands. However, in a next-generation standard, a plurality of mechanisms such as a higher bandwidth (320 MHz), more streams (16 streams), a multiband operation, and access point (AP) collaboration may be introduced, and more information bits need to be transmitted by using a SIG-A. Therefore, a design of the SIG-A in each existing standard cannot meet a future requirement, and a SIG-A indication solution is urgently needed.

SUMMARY

Embodiments of this application provide a signal field indication method and apparatus, to indicate a parameter of a SIG-A.

According to a first aspect, an embodiment of this application provides a signal field indication method. The method includes: generating, by a transmit end, a PPDU, where the PPDU includes a SIG-A indication field, and the SIG-A indication field includes at least one of a field used to indicate a number of SIG-A information symbols and a field used to indicate a SIG-A information bandwidth; and sending, by the transmit end, the PPDU.

Therefore, according to the method provided in this application, the transmit end may indicate different numbers of SIG-A information symbols and/or different SIG-A information bandwidths.

In a possible design, the field used to indicate the number of SIG-A information symbols is a length field included in an L-SIG in the PPDU.

Therefore, the length field included in the L-SIG may be used to indicate different numbers of SIG-A information symbols. In addition, the length field included in the L-SIG is used to indicate the number of SIG-A information symbols, so that a receive end can obtain the number of SIG-A information symbols as soon as possible.

In a possible design, the field used to indicate the number of SIG-A information symbols is a signature symbol field that is in the PPDU and that includes a field used to indicate the number of SIG-A information symbols and/or a field used to indicate an MCS of a SIG-A. An MCS of each SIG-A corresponds to one number of SIG-A information symbols.

Therefore, the field used to indicate the number of SIG-A information symbols and/or the field used to indicate the MCS of the SIG-A, which are/is included in the signature symbol field, may be used to indicate different numbers of SIG-A information symbols, so that the receive end can obtain the number of SIG-A information symbols before the SIG-A. The field used to indicate the MCS of the SIG-A may indirectly indicate the number of SIG-A information symbols.

In a possible design, the field used to indicate the number of SIG-A information symbols is an additional symbol indication field included in the first X1 symbols of the SIG-A; and the additional symbol indication field indicates a difference $\Delta X$ between the number of SIG-A information symbols and X1, a number of values of $\Delta X$ is K, and the K values of $\Delta X$ are in a one-to-one correspondence with K numbers of SIG-A information symbols, where if $\Delta X=0$, the number of SIG-A information symbols is X1, if $\Delta X$ is a positive integer, the number of SIG-A information symbols is X1+$\Delta X$, and both X1 and K are positive integers.

Therefore, the additional symbol indication field included in the first X1 symbols of the SIG-A may be used to indicate different numbers of SIG-A information symbols, and there is little dependency on a symbol design before the SIG-A.

In a possible design, when the number of SIG-A information symbols is X1+$\Delta X$, the first X1 symbols of the SIG-A include the additional symbol indication field, a first CRC, and a first tail bit, the first CRC is used to check whether the first X1 symbols are accurate, and the first tail bit is used by a receive end to terminate decoding of the first X1 symbols; remaining $\Delta X$ symbols of the SIG-A include a second CRC and a second tail bit; and the second CRC is used to check whether the $\Delta X$ symbols are accurate, and the second tail bit is used by the receive end to terminate decoding of the SIG-A.

Therefore, the transmit end divides the SIG-A into two parts for encoding. The first X1 symbols of the SIG-A include the additional symbol indication field, the first CRC, and the first tail bit, the additional symbol indication field may indicate different numbers of SIG-A information symbols, and the remaining $\Delta X$ symbols of the SIG-A include the second CRC and the second tail bit.

In a possible design, the field used to indicate the SIG-A information bandwidth is a length field included in an L-SIG in the PPDU.

Therefore, the length field included in the L-SIG may be used to indicate different SIG-A information bandwidths.

In a possible design, the field used to indicate the SIG-A information bandwidth is a signature symbol field that is in the PPDU and that includes a field used to indicate the SIG-A information bandwidth.

Therefore, the field that is included in the signature symbol field and that is used to indicate the SIG-A information bandwidth may be used to indicate different SIG-A information bandwidths.

In a possible design, the SIG-A information bandwidth is 20 MHz or a first information bandwidth, and the first information bandwidth is a fixed information bandwidth greater than 20 MHz or a PPDU bandwidth.

Therefore, there are a plurality of possible designs of the SIG-A information bandwidth.

In a possible design, the field used to indicate the SIG-A information bandwidth is a signature symbol field that is in the PPDU and that includes a field used to indicate a bandwidth mode. If the bandwidth mode indicated by the field used to indicate the bandwidth mode is a punctured bandwidth, the SIG-A information bandwidth is 20 MHz. If the bandwidth mode indicated by the field used to indicate the bandwidth mode is a non-punctured bandwidth, the SIG-A information bandwidth is a first information bandwidth.

Therefore, the field that is included in the signature symbol field and that is used to indicate the bandwidth mode may be used to indicate different SIG-A information bandwidths.

In a possible design, when the SIG-A information bandwidth is greater than 20 MHz, a subcarrier corresponding to a guard interval between every two adjacent SIG-As within the SIG-A information bandwidth includes a sequence used for channel estimation.

Therefore, the receive end may obtain all required channel information by using an L-LTF sequence and the sequence that is used for the channel estimation and that is in the SIG-A, and the transmit end may transmit information on all subcarriers corresponding to a SIG-B.

According to a second aspect, an embodiment of this application provides a signal field indication method. The method includes: receiving, by a receive end, a PPDU, where the PPDU includes a SIG-A indication field, and the SIG-A indication field includes at least one of a field used to indicate a number of SIG-A information symbols and a field used to indicate a SIG-A information bandwidth; and reading, by the receive end, the SIG-A indication field to learn of at least one of the number of SIG-A information symbols and the SIG-A information bandwidth, and reading the SIG-A based on at least one of the number of SIG-A information symbols and the SIG-A information bandwidth.

Therefore, according to the method in this application, the receive end may read the SIG-A indication field in the PPDU to obtain at least one of the number of SIG-A information symbols and the SIG-A information bandwidth, and the receive end may read the SIG-A based on different numbers of SIG-A information symbols and/or different SIG-A information bandwidths that are indicated by the SIG-A indication field in the PPDU.

In a possible design, the field used to indicate the number of SIG-A information symbols is a length field included in an L-SIG in the PPDU.

In a possible design, the field used to indicate the number of SIG-A information symbols is a signature symbol field that is in the PPDU and that includes a field used to indicate the number of SIG-A information symbols and/or a field used to indicate an MCS of the SIG-A. An MCS of each SIG-A corresponds to one number of SIG-A information symbols.

In a possible design, the field used to indicate the number of SIG-A information symbols is an additional symbol indication field included in the first X1 symbols of the SIG-A; and the additional symbol indication field indicates a difference $\Delta X$ between the number of SIG-A information symbols and X1, a number of values of $\Delta X$ is K, and the K values of $\Delta X$ are in a one-to-one correspondence with K numbers of SIG-A information symbols, where if $\Delta X=0$, the number of SIG-A information symbols is X1, if $\Delta X$ is a positive integer, the number of SIG-A information symbols is X1+$\Delta X$, and both X1 and K are positive integers.

In a possible design, when the number of SIG-A information symbols is X1+$\Delta X$, the first X1 symbols of the SIG-A include the additional symbol indication field, a first CRC, and a first tail bit, the first CRC is used to check whether the first X1 symbols are accurate, and the first tail bit is used by a receive end to terminate decoding of the first X1 symbols; remaining $\Delta X$ symbols of the SIG-A include a second CRC and a second tail bit; and the second CRC is used to check whether the $\Delta X$ symbols are accurate, and the second tail bit is used by the receive end to terminate decoding of the SIG-A.

In a possible design, the field used to indicate the SIG-A information bandwidth is a length field included in an L-SIG in the PPDU.

In a possible design, the field used to indicate the SIG-A information bandwidth is a signature symbol field that is in the PPDU and that includes a field used to indicate the SIG-A information bandwidth.

In a possible design, the SIG-A information bandwidth is 20 MHz or a first information bandwidth, and the first information bandwidth is a fixed information bandwidth greater than 20 MHz or a PPDU bandwidth.

According to a third aspect, an embodiment of this application provides a signal field indication apparatus. The apparatus includes a processing unit and a sending unit, and may further include a storage unit. The storage unit is configured to store an instruction, and the processing unit executes the instruction stored in the storage unit, so that a transmit end performs the method according to any one of the first aspect or the possible designs of the first aspect. The apparatus may be the transmit end, or may be a chip in the transmit end. When the apparatus is the transmit end, the processing unit may be a processor, and the sending unit may be a transceiver. If the storage unit is further included, the storage unit may be a memory. When the apparatus is the chip in the transmit end, the processing unit may be a processor, and the sending unit may be an input/output interface, a pin, a circuit, or the like. The processing unit executes the instruction stored in the storage unit, so that the chip in the transmit end performs the method according to any one of the first aspect or the possible designs of the first aspect. The storage unit may be a storage unit (for example, a register or a cache) inside the chip, or may be a storage unit (for example, a read-only memory or a random access memory) outside the chip.

According to a fourth aspect, an embodiment of this application provides a signal field indication apparatus. The apparatus includes a processing unit and a receiving unit, and may further include a storage unit. The storage unit is configured to store an instruction, and the processing unit executes the instruction stored in the storage unit, so that a receive end performs the method according to any one of the second aspect or the possible designs of the second aspect. The apparatus may be the receive end, or may be a chip in the receive end. When the apparatus is the receive end, the processing unit may be a processor, and the receiving unit may be a transceiver. If the storage unit is further included, the storage unit may be a memory. When the apparatus is the chip in the receive end, the processing unit may be a processor, and the receiving unit may be an input/output interface, a pin, a circuit, or the like. The processing unit executes the instruction stored in the storage unit, so that the chip in the receive end performs the method according to any one of the second aspect or the possible designs of the second aspect. The storage unit may be a storage unit (for example, a register or a cache) inside the chip, or may be a storage unit (for example, a read-only memory or a random access memory) outside the chip.

According to a fifth aspect, an embodiment of this application further provides a computer-readable storage medium. The computer-readable storage medium stores a computer program. When the computer program is run on a computer, the computer is enabled to perform any one of the possible designs of the first aspect or the possible designs of the second aspect.

According to a sixth aspect, an embodiment of this application further provides a computer program product including a program. When the computer program product runs on a computer, the computer is enabled to perform any one of the possible designs of the first aspect or the possible designs of the second aspect.

BRIEF DESCRIPTION OF THE DRAWINGS

FIG. 1 is a schematic structural diagram of a non-HT PPDU according to an embodiment of this application;

FIG. 3 is a schematic structural diagram of a VHT PPDU according to an embodiment of this application;

FIG. 4 is a schematic structural diagram of an HE PPDU according to an embodiment of this application;

FIG. 8 is a first schematic structural diagram of a PPDU with a variable number of EHT-SIG-A information symbols according to an embodiment of this application;

FIG. 12 is a first schematic structural diagram of a PPDU with a variable EHT-SIG-A information bandwidth according to an embodiment of this application;

DETAILED DESCRIPTION OF ILLUSTRATIVE EMBODIMENTS

The following describes the embodiments of this application with reference to the accompanying drawings.

First, a structure of a PPDU in each generation standard is briefly described.

11a/b/g non-high throughput (Non-HT) PPDU: The 11a/b/g non-high throughput PPDU includes data and three preamble fields: a short training field (STF), a long training field (L-LTF), and a SIG, as shown in FIG. 1. The signal field is used to indicate a rate of the data part and a length of a data frame.

Figure 2:
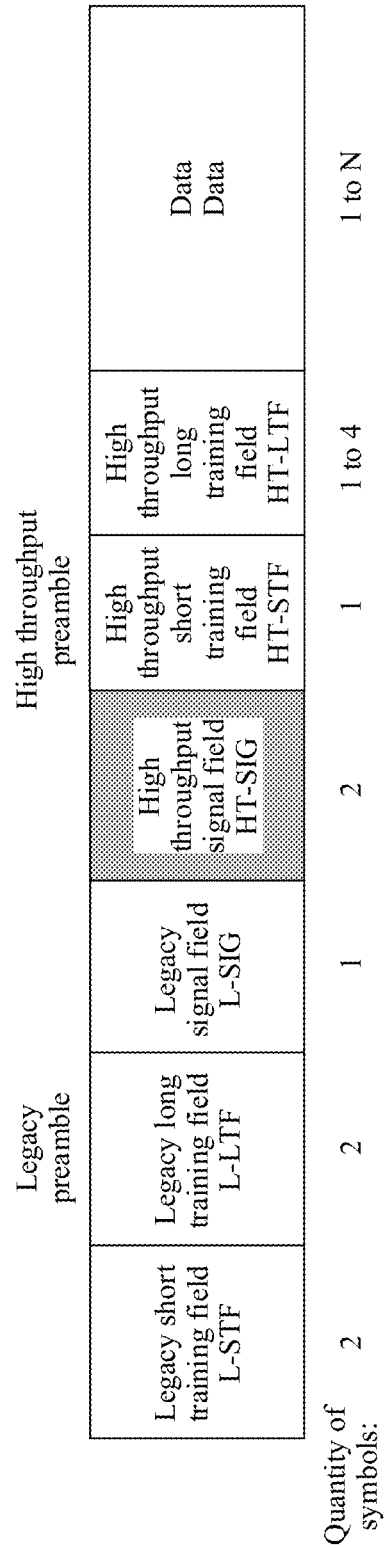
FIG. 2 is a schematic structural diagram of an HT PPDU according to an embodiment of this application.

11n HT PPDU: Differences between the 11n HT PPDU and the 11a/b/g non-HT PPDU lie in that Legacy (L-) is added before the STF, the LTF, and the SIG to represent legacy fields, thereby ensuring coexistence with legacy devices, and that an HT-SIG, an HT-STF, and an HT-LTF that are used to assist in HT data transmission are added. Compared with the L-SIG including one symbol, the HT-SIG includes two symbols and further carries information such as a PPDU bandwidth, a modulation and coding scheme, and a number of spatial streams, as shown in FIG. 2.

11ac VHT PPDU: Compared with the foregoing two types of PPDUs, the 11ac VHT PPDU further includes a VHT-SIG-A, a VHT-STF, a VHT-LTF, and a VHT-SIG-B in addition to a legacy signal field. The VHT-SIG-A is similar to the HT-SIG, and is used to indicate signal information required by a corresponding VHT function. The VHT-SIG-B is mainly used for a downlink multi-user multiple input multiple output (DL MU-MIMO) function, as shown in FIG. 3.

11ax high efficient (HE) PPDU: The HE PPDU includes four modes: an HE single user (SU) PPDU, a HE multi-user (multiple user, MU) PPDU, a HE extended range (ER) SU PPDU, and an HE trigger-based (trigger based, TB) PPDU. In addition to a legacy preamble, repetition of the legacy signal field is further included, to enhance reliability of the legacy signal field. In addition, an automatic detection method for a receive end to identify, by detecting whether two symbols are the same, that a PPDU is an HE PPDU is further provided. The PPDU further includes an HE-SIG-A, a HE-SIG-B, a HE-STF, a HE-LTF, and packet extension (PE). The HE-SIG-A is similar to the HT-SIG and the VHT-SIG-A, and is used to indicate signal information required by a corresponding HE function. Particularly, the HE-SIG-B is used to indicate resource indication information of a station (STA), as shown in FIG. 4. When the PPDU is an HE ER SU PPDU, the HE-SIG-A includes four symbols, where information on a second symbol is the same as information on a first symbol, and information on a fourth symbol is the same as information on a third symbol. Therefore, a number of information symbols required for information transmission is still 2. For the other three formats, the HE-SIG-A includes two symbols and two information symbols.

It can be learned from the above that, starting from 11n, based on the L-SIG, the HT-SIG is introduced to further indicate signal information required for parsing data. Similarly, starting from 11ac, based on the L-SIG, the VHT-SIG-A is introduced to further indicate signal information required for parsing data, and starting from 11ax, based on the L-SIG, the HE-SIG-A is introduced to further indicate signal information required for parsing data. As first fields used to carry signal information required by a corresponding standard after the L-SIG, these fields carry important signal information such as a PPDU bandwidth and a data modulation scheme. How to design and indicate an EHT-SIG-A of a new extremely high throughput (EHT) PPDU in a next-generation standard of 802.11ax is a problem that needs to be resolved in this application. EHT is currently an identifier for a next-generation standard, and this application is not limited to the identifier. Other identifiers such as extreme throughput (XT) and ultra high throughput (UHT) may also be used. This is not limited in this application.

Figure 5:
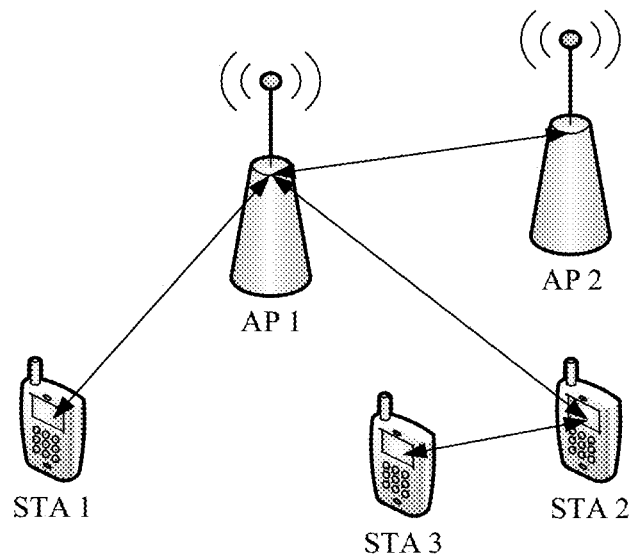
FIG. 5 is a schematic diagram of an application scenario according to an embodiment of this application.

It should be understood that an application scenario in the embodiments of this application may be communication between an AP and one or more STAs, and this application is also applicable to communication between APs and communication between STAs, as shown in FIG. 5.

In addition, a number of information symbols in the embodiments of this application is a number of symbols required for carrying information. When information on a symbol is replicated, a number of symbols is a multiple of a number of information symbols in a field. When no information on a symbol is replicated, a number of symbols is the same as a number of information symbols. An information bandwidth in the embodiments of this application is a basic bandwidth required for carrying encoding information. When a PPDU bandwidth is greater than the information bandwidth, information is replicated and transmitted in a unit of the information bandwidth at different frequencies.

Figure 6:
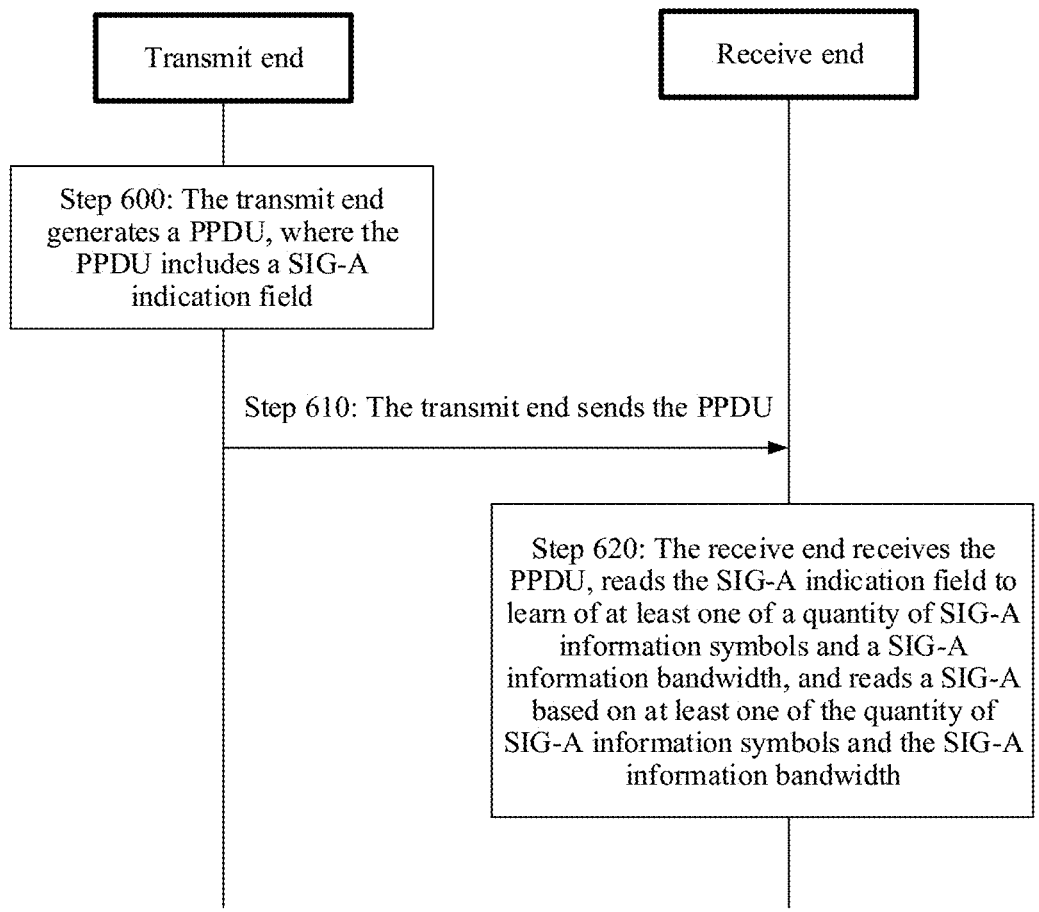
FIG. 6 is an overview flowchart of a signal field indication method according to an embodiment of this application.

Referring to FIG. 6, an embodiment of this application provides a signal field indication method, to design and indicate a parameter of a SIG-A, for example, design and indicate a parameter of an EHT-SIG-A.

Step 600: A transmit end generates a PPDU, where the PPDU includes a SIG-A indication field, and the SIG-A indication field includes at least one of a field used to indicate a number of SIG-A information symbols and a field used to indicate a SIG-A information bandwidth.

It should be understood that the SIG-A indication field may include the field used to indicate the number of SIG-A information symbols, or the SIG-A indication field may include the field used to indicate the SIG-A information bandwidth, or the SIG-A indication field may include the field used to indicate the number of SIG-A information symbols and the field used to indicate the SIG-A information bandwidth.

In one case, the number of SIG-A information symbols is variable. For example, the number of SIG-A information symbols may be 1, 2, or 3. In another case, the SIG-A information bandwidth is variable. For example, the SIG-A information bandwidth may be 20 MHz, or a fixed information bandwidth (for example, 40 MHz or 80 MHz) greater than 20 MHz. Alternatively, the SIG-A information bandwidth may be 20 MHz, or a PPDU bandwidth. In still another case, the number of SIG-A information symbols is variable and the SIG-A information bandwidth is also variable.

It should be noted that the field used to indicate the number of SIG-A information symbols in this embodiment of this application may alternatively be replaced with a field used to indicate a number of SIG-A symbols. When information on a symbol is replicated, the number of SIG-A symbols is a multiple of the number of SIG-A information symbols. When no information on a symbol is replicated, the number of SIG-A symbols is the same as the number of SIG-A information symbols. For example, if it is specified in a next-generation standard that no information is replicated, a field used to indicate the number of SIG-A information symbols is equivalent to a field used to indicate the number of SIG-A symbols. If it is specified in a next-generation standard that information is replicated, whether information replication exists in the PPDU may be first indicated. If information is replicated, the number of SIG-A symbols that is indicated by the field used to indicate the number of SIG-A symbols, is inferred to obtain the number of SIG-A information symbols. If no information is replicated, the number of SIG-A symbols that is indicated by the field used to indicate the number of SIG-A symbols is the same as the number of SIG-A information symbols.

Step 610: The transmit end sends the PPDU.

Step 620: A receive end receives the PPDU, reads the SIG-A indication field to learn of at least one of the number of SIG-A information symbols and the SIG-A information bandwidth, and reads a SIG-A based on at least one of the number of SIG-A information symbols and the SIG-A information bandwidth.

Specifically, when the SIG-A indication field includes the field used to indicate the number of SIG-A information symbols, the receive end reads the field used to indicate the number of SIG-A information symbols. Alternatively, when the SIG-A indication field includes the field used to indicate the SIG-A information bandwidth, the receive end reads the field used to indicate the SIG-A information bandwidth. Alternatively, when the SIG-A indication field includes the field used to indicate the number of SIG-A information symbols and the field used to indicate the SIG-A information bandwidth, the receive end reads the field used to indicate the number of SIG-A information symbols and the field used to indicate the SIG-A information bandwidth.

The following describes in detail designs of the field used to indicate the number of SIG-A information symbols and the field used to indicate the SIG-A information bandwidth. It should be understood that the following solutions are merely examples, and are not intended to limit this embodiment of this application.

First part: The field used to indicate the number of SIG-A information symbols may be designed by using, but not limited to, the following fields.

Solution 1: The field used to indicate the number of SIG-A information symbols is a length field included in an L-SIG in the PPDU.

Figure 7:
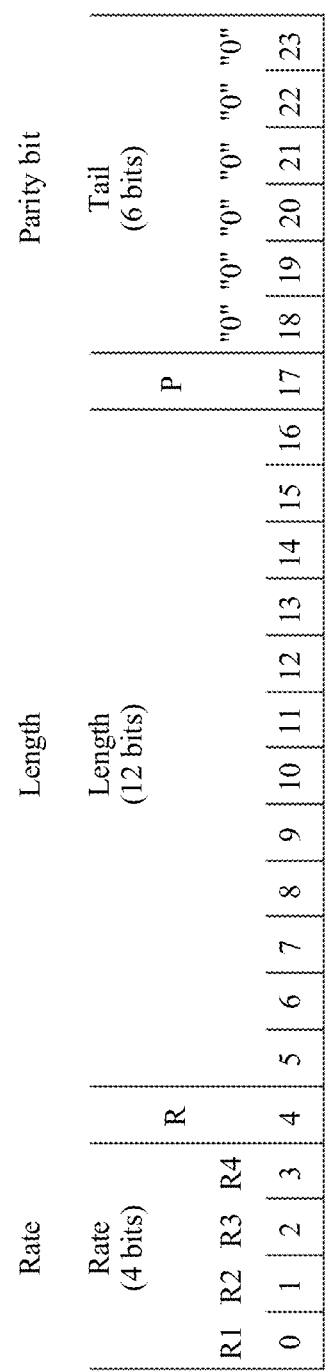
FIG. 7 is a schematic structural diagram of an L-SIG according to an embodiment of this application.

A structure of the L-SIG is shown in FIG. 7, and includes a rate field, a reserved field (reserved, R), a length field, a parity bit (P), and a tail bit.

A length of the length field =

$$\left\lceil \frac{TXTIME - SignalExtension - 20}{4} \right\rceil \times 3 - 3m.$$

TXTIME represents sending duration of sending the PPDU. SignalExtension represents a length of signal extension, and $\lceil \; \rceil$ represents rounding up. A number of values of m is K, and the K values of m correspond to at least of two numbers of SIG-A information symbols, for example, may be in a one-to-one correspondence with K SIG-A information bandwidths. K is a positive integer greater than or equal to 2.

For example, when K=2 and the value of m is 1 or 2, if m=1, the length field indicates that the number of SIG-A information symbols is X1, or if m=2, the length field indicates that the number of SIG-A information symbols is X2. X1 and X2 are different positive integers. Alternatively, when K=3, if m=0, the length field indicates that the number of SIG-A information symbols is X1, if m=1, the length field indicates that the number of SIG-A information symbols is X2, or if m=3, the length field indicates that the number of SIG-A information symbols is X3. X1, X2, and X3 are different positive integers.

For example, when m=1, a number of EHT-SIG-A information symbols is 3; or when m=2, a number of EHT-SIG-A information symbols is 2. If BPSK and 1/2 code rate modulation are used, each EHT-SIG-A symbol may carry 26 information bits. When the number of EHT-SIG-A information symbols is 3, the EHT-SIG-A may carry 78 information bits. When the number of EHT-SIG-A information symbols is 2, the EHT-SIG-A may carry 52 information bits. For another example, when m=1, a number of EHT-SIG-A information symbols is 1; or when m=2, a number of EHT-SIG-A information symbols is 2. When the number of EHT-SIG-A information symbols is 1, the EHT-SIG-A may carry 26 information bits. When the number of EHT-SIG-A information symbols is 2, the EHT-SIG-A may carry 52 information bits.

Further, after the receive end receives the PPDU, the receive end may read the length field in the L-SIG to obtain the value of m, and further obtain the corresponding number of SIG-A information symbols by using the value of m. For example, as shown in FIG. 8, after receiving the PPDU, the receive end performs automatic detection, identifies that the PPDU is an EHT PPDU, reads a length field in an L-SIG in the EHT PPDU, obtains a corresponding number of EHT-SIG-A information symbols by using the value of m, and further obtains corresponding information content by demodulating the EHT-SIG-A according to the number of EHT-SIG-A information symbols.

TABLE 1

Information bits carried by EHT-SIG-A

| A number of EHT-SIG-A information symbols is 3 | | The number of EHT-SIG-A information symbols is 2 | | The number of EHT-SIG-A information symbols is 1 | | |
| --- | --- | --- | --- | --- | --- | --- |
| Field | Number of bits | Field | Number of bits | Field | Number of bits | Meaning |
| Format | 2 | Format | 2 | | | Used to differentiate EHT sub-formats. When the number of EHT-SIG-A information symbols is 1, a fixed format is used, and no indication is required. |
| Uplink/Downlink | 1 | Uplink/Downlink | 1 | Uplink/Downlink | 1 | Used to differentiate between an uplink and a downlink. |
| MCS | 4 | MCS | 4 | MCS | 4 | Used to indicate a modulation and coding scheme (Modulation and Coding Scheme, MCS) of data. |
| Transmitter address ID | 12 | Transmitter address ID | 6 | | | When the number of EHT-SIG-A information symbols is 3, a transmitter address of more bits is used to reduce a conflict probability of the transmitter address, or when the number of EHT-SIG-A information symbols is 1, a transmitter address identifier is not indicated at a physical layer, but a 6-byte transmitter address is indicated only at a medium access control (Medium Access Control, MAC) layer. |
| Receiver address ID | 12 | Receiver address ID | 4 | | | Similar to the transmitter address ID. |
| Bandwidth | 6 | Bandwidth | 3 | Bandwidth | 3 | When the number of EHT-SIG-A information symbols is 3, a more flexible bandwidth indication is used, or when the number of EHT-SIG-A information symbols is 1, a fixed bandwidth may be used instead of a bandwidth indication. |
| Guard interval + long training sequence size | 2 | Guard interval + long training sequence size | 2 | | | Used to indicate a guard interval of data and a long training sequence field, and the long training sequence size. When the number of EHT-SIG-A information |

TABLE 1-continued

Information bits carried by EHT-SIG-A

| | A number of EHT-SIG-A information symbols is 3 | | The number of EHT-SIG-A information symbols is 2 | | The number of EHT-SIG-A information symbols is 1 | | |
|---|---|---|---|---|---|---|---|
| Field | Number of bits | Field | Number of bits | Field | Number of bits | Meaning |
| | | | | | | | symbols is 1, a fixed guard interval and a fixed long training sequence size are used. Therefore, no indication is required. |
| Number of space-time streams and intermediate preamble period | 4 | Number of space-time streams and intermediate preamble period | 4 | Number of space-time streams | 4 | Used to indicate the number of space-time streams (1 to 16) and an intermediate preamble period in a Doppler mode. |
| TXOP | 7 | TXOP | 7 | | | Used to indicate a transmit opportunity (Transmit Opportunity, TXOP). When the number of EHT-SIG-A information symbols is 1, no indication is performed at the physical layer. Therefore, no indication is required. |
| Coding scheme | 1 | Coding scheme | 1 | Coding scheme | 1 | Used to indicate whether binary convolution code (Binary Convolution Code, BCC) coding or low density parity code (Low Density Parity Code, LDPC) coding is used. |
| LDPC additional symbol indicator | 1 | LDPC additional symbol indicator | 1 | LDPC additional symbol indicator | 1 | |
| Space time block code (Space Time Block Code, STBC) | 1 | STBC | 1 | STBC | 1 | |
| Transmit beamforming (Transmit Beamforming, TxBF) | 1 | TxBF | 1 | TxBF | 1 | |
| Packet extension factor indication before FEC | 2 | Packet extension factor indication before FEC | 2 | | | Used to indicate a packet extension factor before packet extension forward error control (forward error control, FEC). When the number of EHT-SIG-A information symbols is 1, a fixed factor (for example, 4) is used by default. Therefore, no indication is required. |
| Packet extension non-ambiguity indication | 1 | Packet extension non-ambiguity indication | 1 | Packet extension non-ambiguity indication | 1 | |
| Doppler | 1 | Doppler | 1 | | | Used to indicate whether a current PPDU uses the Doppler mode. When the number of EHT-SIG-A information symbols is 1, the Doppler mode is not used. Therefore, no indication is required. |
| Dual-carrier modulation | 1 | Dual-carrier modulation | 1 | Dual-carrier modulation | 1 | |
| Cyclic redundancy code (cyclic redundancy code, CRC) | 8 | CRC | 4 | CRC | 4 | When the number of EHT-SIG-A information symbols is 3, more information is transmitted, and a cyclic redundancy code of more bits is used to enhance a parity capability. |
| Tail bit | 6 | Tail bit | 6 | | | Used to indicate a BCC tail bit. When the number of EHT-SIG-A information symbols is 1, a tail biting solution may be used, and the tail bit is not required. |
| Others/Reserved | 5 | | 0 | | 4 | |
| Total | 78 | | 52 | | 26 | |

Table 1 shows an example of information transmitted in the EHT-SIG-A when the number of EHT-SIG-A information symbols is 3, 2, or 1. It can be learned from Table 1 that, as a whole, when there are a large number of information symbols, more fields can be transmitted, or corresponding fields can be used to transmit more bits, to make information more precise, so that signal information required for more functions can be supported, for example, different functions such as full duplex, AP coordination, and spatial multiplexing are supported. When there are a small number of information symbols, some parameters need to be fixed, or some functions needs to be disabled.

Therefore, in the foregoing solution 1, different numbers of SIG-A information symbols can be flexibly indicated, so that a balance among information precision, a number of supported functions, and signal overheads can be made. In addition, the length field in the L-SIG is used to indicate the number of SIG-A information symbols, so that the receive end can obtain the number of SIG-A information symbols as soon as possible, to obtain corresponding signal information as soon as possible, perform a corresponding function, and increase duration of multiplex transmission and coordinated transmission. In addition, indication of the number of SIG-A information symbols may enable the transmit end to perform more refined bandwidth indication, and enable the transmit end to perform transmission by using a larger PPDU bandwidth in a preamble puncture manner (a preamble is not transmitted in some 20 MHz bandwidths) when interference or a radar signal exists in some channels, thereby improving system spectral efficiency and increasing a system throughput. Compared with overheads of one signal field, more gains are obtained.

Solution 2: The field used to indicate the number of SIG-A information symbols is a signature symbol field that is in the PPDU and that includes a field used to indicate the number of SIG-A information symbols and/or a field used to indicate an MCS of the SIG-A.

Figure 9:
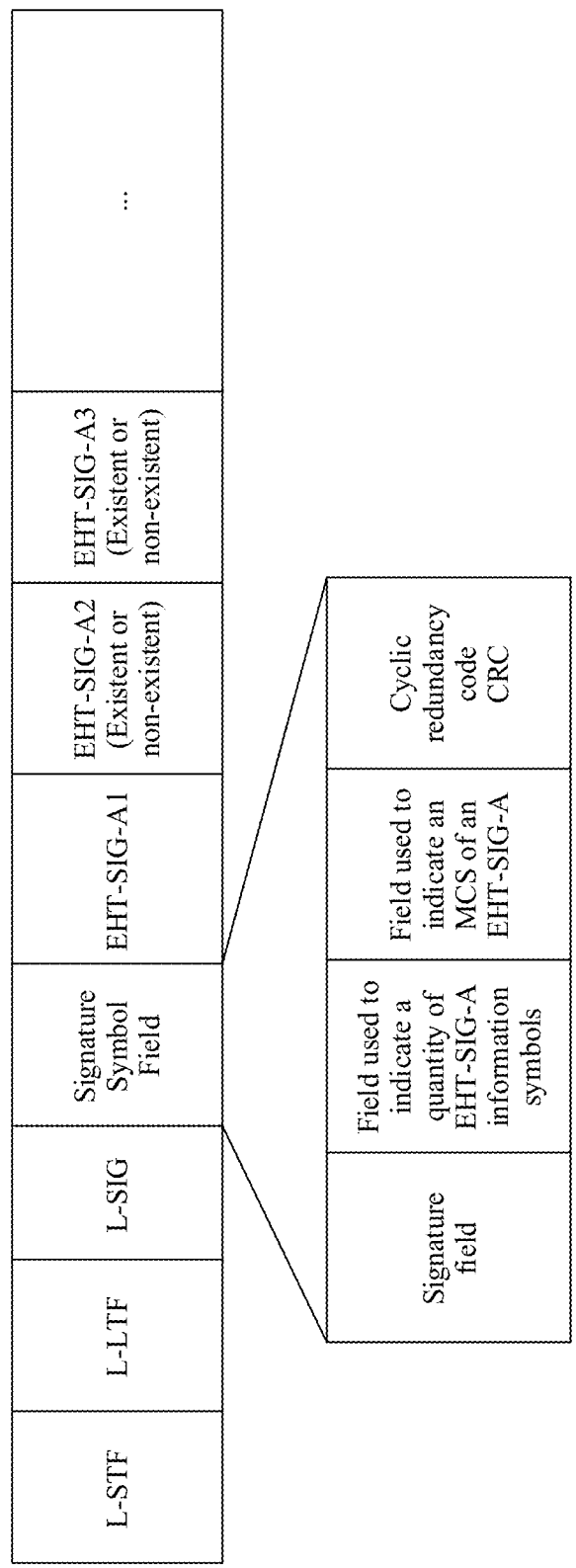
FIG. 9 is a second schematic structural diagram of a PPDU with a variable number of EHT-SIG-A information symbols according to an embodiment of this application.

The signature symbol field includes a predetermined sequence known to both the transmit end and the receive end, and the signature symbol field is located after an L-SIG and before the SIG-A. For example, as shown in FIG. 9, the signature symbol field includes a signature field, a field used to indicate a number of EHT-SIG-A information symbols, the field used to indicate the MCS of the SIG-A, and a CRC. The signature field is used to identify that the PPDU is an EHT PPDU.

It should be understood that the signature symbol field is a symbol field used by the receive end to perform automatic detection on the PPDU sent by the transmit end, so that the receive end determines a type of the PPDU. The signature symbol field herein may also be referred to as an EHT mark symbol, a symbol used for automatic detection, or the like. A specific name of the symbol is not limited in this application.

The field used to indicate the number of SIG-A information symbols may be 1 bit, and the number of SIG-A information symbols may be X1 or X2. X1 and X2 are different positive integers. For example, X1=2, and X2=3. Alternatively, the field used to indicate the SIG-A information bandwidth may be 2 bits, and the number of SIG-A information symbols may be X1, X2, X3, or X4. X1, X2, X3, and X4 are positive integers, and at least two of them are different from each other.

It should be understood that the field used to indicate the number of SIG-A information symbols may be the field that is included in the signature symbol field in the PPDU and that is used to indicate the number of SIG-A information symbols.

Alternatively, the field used to indicate the number of SIG-A information symbols may be the field that is included in the signature symbol field in the PPDU and that is used to indicate the MCS of the SIG-A, and an MCS of each SIG-A corresponds to one number of SIG-A information symbols. For example, when the MCS that is of the SIG-A and that is indicated by the field used to indicate the MCS of the SIG-A is MCS 0, the corresponding number of SIG-A information symbols is 2. When the MCS that is of the SIG-A and that is indicated by the field used to indicate the MCS of the SIG-A is MCS 1, the corresponding number of SIG-A information symbols is 1. For another example, when the MCS that is of the SIG-A and that is indicated by the field used to indicate the MCS of the SIG-A is MCS 0 or MCS 1, the corresponding number of SIG-A information symbols is 2. When the MCS that is of the SIG-A and that is indicated by the field used to indicate the MCS of the SIG-A is MCS 2, the corresponding number of SIG-A information symbols is 1.

Alternatively, the field used to indicate the number of SIG-A information symbols may be the field that is included in the signature symbol field in the PPDU and that is used to indicate the number of SIG-A information symbols, and the field used to indicate the MCS of the SIG-A.

Further, after receiving the PPDU, the receive end reads the signature symbol field, and obtains the number of SIG-A information symbols by using the field that is in the signature symbol field and that is used to indicate the number of SIG-A information symbols; or obtains the MCS of the SIG-A by using the field that is in the signature symbol field and that is used to indicate the MCS of the SIG-A, to obtain the corresponding number of SIG-A information symbols. For example, as shown in FIG. 9, after receiving the PPDU, the receive end reads a signature symbol field following the L-SIG, identifies, by using a signature field in the signature symbol field, that the PPDU is an EHT PPDU, obtains the number of EHT-SIG-A information symbols by using a field that is in the signature symbol field and that is used to indicate the number of EHT-SIG-A information symbols, obtains an MCS of the EHT-SIG-A by using a field that is in the signature symbol field and that is used to indicate the MCS of the EHT-SIG-A, and further obtains corresponding information content by demodulating the EHT-SIG-A according to the number of EHT-SIG-A information symbols and the MCS of the EHT-SIG-A.

Therefore, in the solution 2, the field used to indicate the number of SIG-A information symbols and/or the field used to indicate the MCS of the SIG-A, which are/is included in the signature symbol field, are/is used, so that the receive end can obtain the number of SIG-A information symbols before the SIG-A. The solution 2 can flexibly indicate different numbers of SIG-A information symbols, that is, achieves beneficial effects of the solution 1. Moreover, because the signature symbol field may further include the field used to indicate the MCS of the SIG-A, the receive end can learn of an information transmission rate by obtaining the MCS of the SIG-A. A higher MCS indicates a higher information transmission rate, more information bits that can be transmitted, or lower overheads.

Solution 3: The field used to indicate the number of SIG-A information symbols is an additional symbol indication field included in the first X1 symbols of the SIG-A.

The additional symbol indication field indicates a difference ΔX between the number of SIG-A information symbols and X1, a number of values of ΔX is K, and the K values of ΔX correspond to at least two numbers of SIG-A information symbols. For example, the K values of ΔX may be in a one-to-one correspondence with K numbers of SIG-A information symbols, where if ΔX=0, the number of SIG-A information symbols is X1, if ΔX is a positive integer, the number of SIG-A information symbols is X1+ΔX, X1 is a positive integer, and K is a positive integer greater than or equal to 2.

Figure 10:
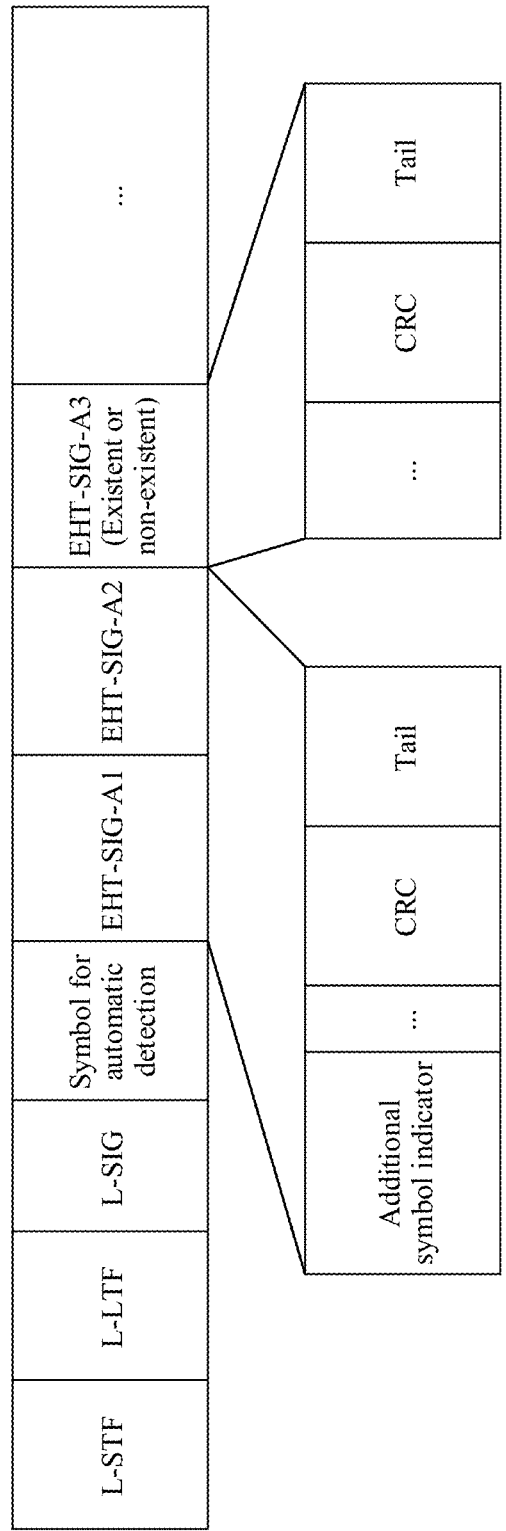
FIG. 10 is a third schematic structural diagram of a PPDU with a variable number of EHT-SIG-A information symbols according to an embodiment of this application.

For example, for FIG. 10, X1=2, ΔX=0 or 1, an additional symbol indication field in the first two symbols indicates whether there are ΔX additional EHT-SIG-A symbols. If the additional symbol indication field indicates that ΔX=0, the number of EHT-SIG-A information symbols is X1=2. If the additional symbol indication field indicates that ΔX=1, the number of EHT-SIG-A information symbols is X1+ΔX=3. In this case, the additional symbol indication field is 1 bit. For another example, the additional symbol indication field may be 2 bits. In this case, the additional symbol indication field may indicate four different numbers of SIG-A information symbols. For example, the number of SIG-A information symbols may be 2, 4, 6, or 8. When X1=2, the additional symbol indication field may indicate that ΔX is 0, 2, 4, or 6.

In a possible design, when the number of SIG-A information symbols is X1+ΔX, the first X1 symbols of the SIG-A include the additional symbol indication field, a first CRC, and a first tail bit, the first CRC is used to check whether the first X1 symbols are accurate, and the first tail bit is used by the receive end to terminate decoding of the first X1 symbols; remaining ΔX symbols of the SIG-A include a second CRC and a second tail bit; and the second CRC is used to check whether the ΔX symbols are accurate, and the second tail bit is used by the receive end to terminate decoding of the SIG-A.

For example, as shown in FIG. 10, it is assumed that there are two possibilities for the number of EHT-SIG-A information symbols: X1 and X2, where X1<X2, X1=2, and the value of ΔX may be 0 or 1. The transmit end first encodes the first two symbols of the EHT-SIG-A, where a last part of information on the first two symbols includes a CRC, used to check whether the information on the first two symbols is accurate, and six tail bits being 0, used by the receive end to terminate decoding of the first two symbols. In addition, the additional symbol indication field is further included, to indicate whether there are ΔX additional EHT-SIG-A symbols. If the additional symbol indication field indicates that there is an additional EHT-SIG-A symbol, a last part of information on the additional EHT-SIG-A symbol also includes a CRC, used to check whether the information of the additional EHT-SIG-A symbol is accurate, and six tail bits being 0, used to terminate decoding of the additional EHT-SIG-A symbol (or all EHT-SIG-A symbols).

Further, after receiving the PPDU, the receive end obtains the corresponding number of SIG-A information symbols by reading the additional symbol indication field included in the first X1 symbols of the SIG-A. For example, the receive end obtains the PPDU, first identifies that the PPDU is an EHT PPDU, and then demodulates the first X1 symbols of the EHT-SIG-A. If it is identified, by using a CRC, that a decoding error occurs in the EHT-SIG-A, it is considered that a packet demodulation error occurs. If the CRC check is successful, the additional symbol indication field is read. If the additional symbol indication field indicates that there is no additional EHT-SIG-A symbol, information in the EHT-SIG-A is read according to X1 EHT-SIG-A symbols. If the additional symbol indication field indicates that there is an additional EHT-SIG-A symbol, subsequent ΔX EHT-SIG-A symbols continue to be demodulated.

Figure 11:
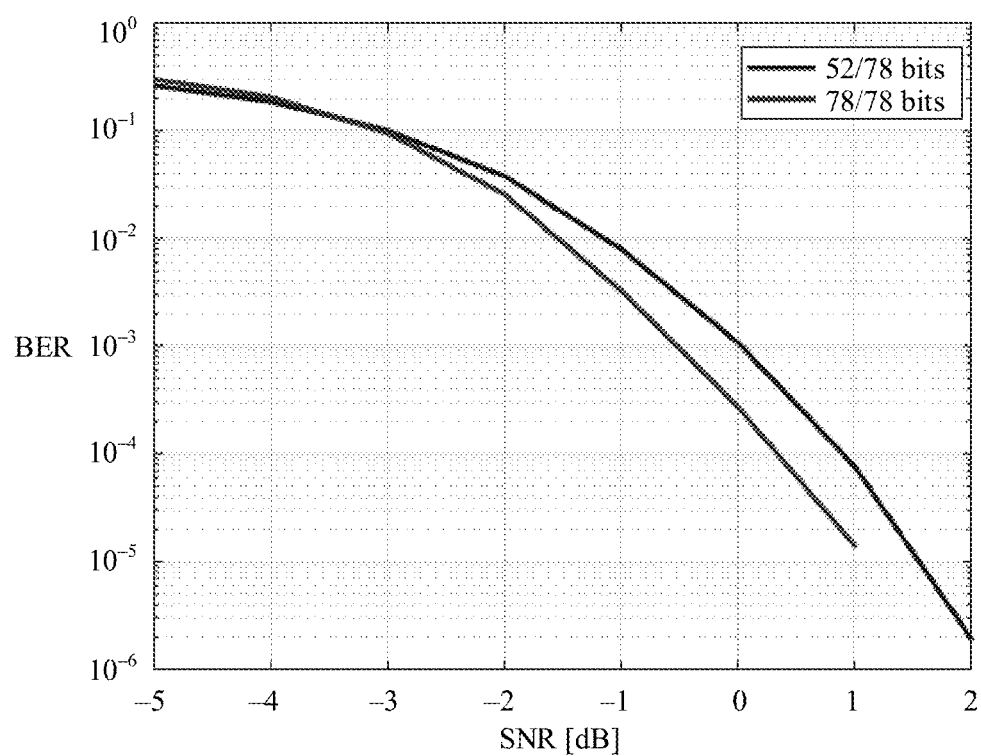
FIG. 11 is a schematic diagram of a gain effect of joint demodulation according to an embodiment of this application.

In a possible design, the receive end can decode additional symbols by continuing the Viterbi from a same state at the end of X1 previous symbols and perform joint decoding on the EHT-SIG-A. As shown in FIG. 11, if the joint decoding is used, when a number of EHT-SIG-A information symbols is 3, an overall bit error rate (BER) of 78 bits is lower than a BER of the first 52 bits at a same signal to noise ratio (SNR).

Therefore, in the solution 3, the additional symbol indication field included in the first X1 symbols of the SIG-A is used to obtain the number of SIG-A information symbols, so that different numbers of SIG-A information symbols can be flexibly indicated, that is, beneficial effects of the solution 1 are achieved, and there is little dependency on a symbol design before the SIG-A.

Second part: The field used to indicate the SIG-A information bandwidth may be designed by using, but not limited to, the following fields:

Solution 1: The field used to indicate the SIG-A information bandwidth is a length field included in an L-SIG in the PPDU.

A structure of the L-SIG is shown in FIG. 7.

A length of the length field =

$$\left\lceil \frac{TXTIME - SignalExtension - 20}{4} \right\rceil \times 3 - 3m.$$

A number of values of m is K, and the K values of m correspond to at least two SIG-A information bandwidths, for example, may be in a one-to-one correspondence with the K SIG-A information bandwidths. K is a positive integer greater than or equal to 2.

For example, when K=2 and the value of m is 1 or 2, if m=1, the length field indicates that the SIG-A information bandwidth is X1, or if m=2, the length field indicates that the SIG-A information bandwidth is X2. X1 and X2 are different positive integers.

For example, when K=2 and the value of m is 1 or 2, if m=1, the length field indicates that the EHT-SIG-A information bandwidth is 20 MHz, or if m=2, the length field indicates that the EHT-SIG-A information bandwidth is a PPDU bandwidth. The PPDU bandwidth may be carried by using a signature symbol field, or the receive end performs blind detection by using a preamble field.

For another example, when K=2 and the value of m is 1 or 2, if m=1, the length field indicates that the EHT-SIG-A information bandwidth is 20 MHz, or if the PPDU bandwidth is greater than 20 MHz, information is replicated in different 20 MHz frequency bands. If m=2, the length field indicates that the EHT-SIG-A information bandwidth is a fixed information bandwidth greater than 20 MHz. It is assumed that the fixed information bandwidth greater than 20 MHz is 40 MHz. If the PPDU bandwidth is greater than 40 MHz, information is replicated in different 40 MHz frequency bands. As shown in FIG. 12, if m=1, the PPDU is sent in a form of a first half part in FIG. 12, and the EHT-SIG-A is modulated in a basic unit of 20 MHz. This solution is applicable to a case in which the PPDU bandwidth is 20 MHz, or one or more receive bandwidths of one or more STAs support only 20 MHz, or, as shown in FIG. 12, there is a preamble puncture scenario. If m=2, the PPDU is sent in a form of a second half part in FIG. 12, and the EHT-SIG-A is modulated in a basic unit of 40 MHz. In this solution, the EHT-SIG-A can be used to transmit more information bits on one symbol, thereby reducing overheads of the EHT-SIG-A.

For another example, when K=2 and the value of m is 1 or 2, if m=1, a bandwidth mode indicated by the length field is a puncture mode, and an EHT-SIG-A information bandwidth corresponding to the puncture mode is 20 MHz. If m=2, a bandwidth mode indicated by the length field is a non-puncture mode, and an EHT-SIG-A information bandwidth corresponding to the non-puncture mode is a PPDU bandwidth. Alternatively, when K=2 and the value of m is 1 or 2, if m=1, a bandwidth mode indicated by the length field is a puncture mode, and an EHT-SIG-A information bandwidth corresponding to the puncture mode is 20 MHz. If m=2, a bandwidth mode indicated by the length field is a non-puncture mode, and an EHT-SIG-A information bandwidth corresponding to the non-puncture mode is a fixed information bandwidth greater than 20 MHz.

Figure 13:
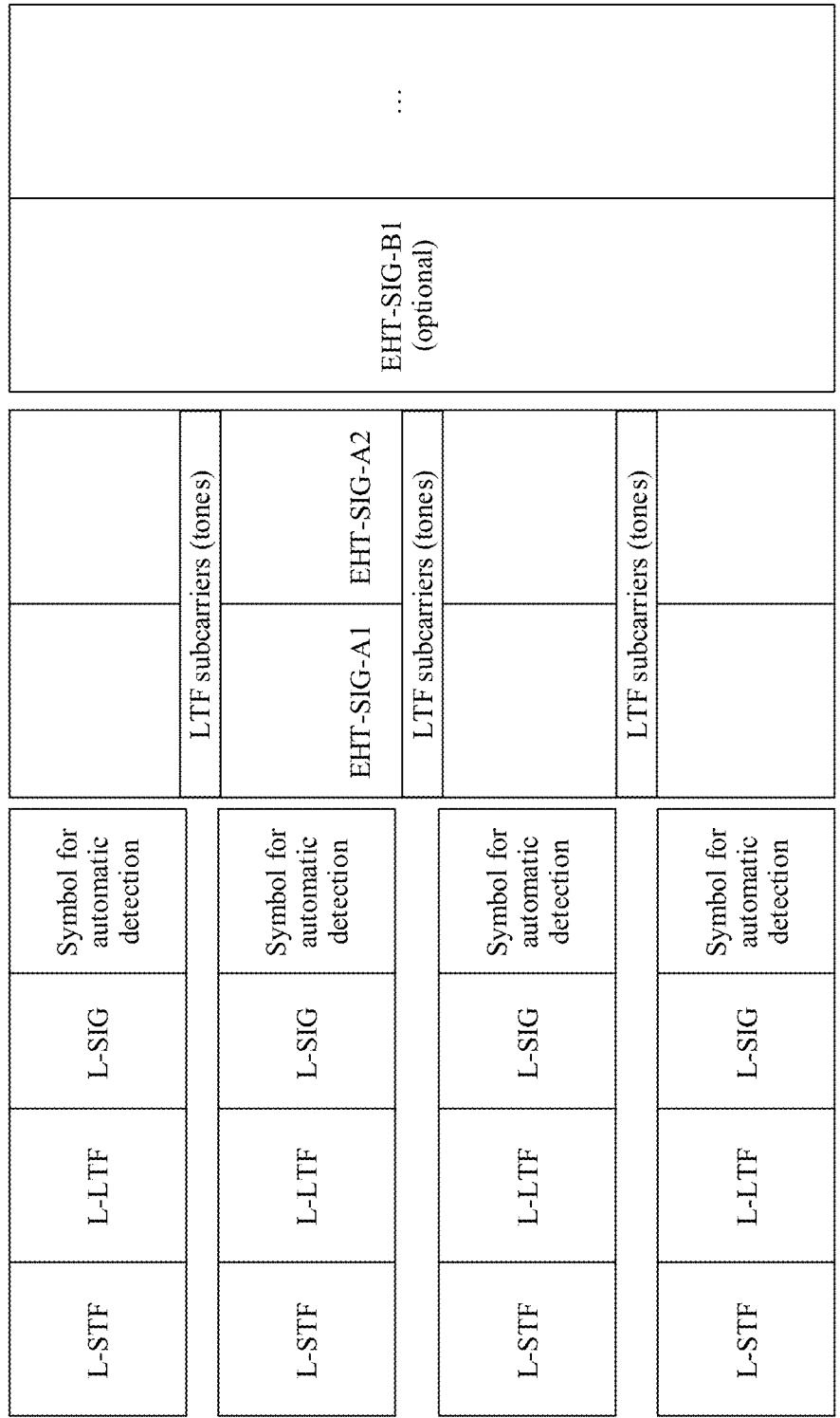
FIG. 13 is a second schematic structural diagram of a PPDU with a variable EHT-SIG-A information bandwidth according to an embodiment of this application.

It should be noted that, because an L-LTF used for channel estimation is sent in a unit of 20 MHz, a guard interval is reserved between two L-LTFs, that is, there is no L-LTF sequence on some subcarriers, and the channel estimation cannot be performed. This application proposes that SIG-A information may not be transmitted on a subcarrier corresponding to a reserved guard interval, that is, null is marked in FIG. 12. Alternatively, a sequence used for the channel estimation is inserted into a subcarrier corresponding to a reserved guard interval, that is, LTF subcarriers (tones) marked in FIG. 12. In this way, on symbols after the SIG-A, these subcarriers may be used to transmit information. As shown in FIG. 13, an EHT-SIG-A is transmitted in a basic unit of 80 MHz. In the EHT-SIG-A, the channel estimation cannot be performed on the reserved guard interval by using the L-LTF, and LTF tones are transmitted on a subcarrier corresponding to the reserved guard interval. In this way, in an EHT-SIG-B field, the receive end can obtain all required channel information by using the L-LTF and the LTF tones in the EHT-SIG-A. Therefore, information may also be transmitted on a subcarrier corresponding to the EHT-SIG-B.

For example, when the PPDU bandwidth is 80 MHz and includes a total of 256 subcarriers (−128, . . . , 127), and the SIG-A information bandwidth is 40 MHz, the SIG-A occupies the following subcarriers in four 20 MHz frequency bands in ascending order of frequencies: (−124, . . . , −69), (−60, . . . , −5), (4, . . . , 59), and (68, . . . , 123). There are 224 subcarriers in total. In ascending order of the frequencies, a first 20 MHz frequency band and a second 20 MHz frequency band may form a first SIG-A whose information bandwidth is 40 MHz, and a third 20 MHz frequency band and a fourth 20 MHz frequency band may form a second SIG-A whose information bandwidth is 40 MHz. Based on this subcarrier plan (tone plan), a sequence known to both the transmit end and the receive end may be transmitted on a part or all of the subcarriers (−68, . . . , 61) and the subcarriers (59, . . . , 67). The sequence is used for channel estimation.

Further, after the receive end receives the PPDU, the receive end may read the length field in the L-SIG to obtain the value of m, and further obtain the corresponding SIG-A information bandwidth by using the value of m.

Therefore, in the solution 1, the length field in the L-SIG is used to obtain the value of m, and the corresponding SIG-A information bandwidth is obtained by using the value of m, so that different SIG-A information bandwidths can be flexibly indicated, to increase a number of information bits that can be carried by the SIG-A.

Solution 2: The field used to indicate the SIG-A information bandwidth is a signature symbol field that is in the PPDU and that includes a field used to indicate the SIG-A information bandwidth. The signature symbol field includes a predetermined sequence known to both the transmit end and the receive end, and the signature symbol field is located after an L-SIG and before the SIG-A.

The field used to indicate the SIG-A information bandwidth may be 1 bit. For example, the SIG-A information bandwidth indicated by the field used to indicate the SIG-A information bandwidth may be 20 MHz or a fixed information bandwidth (for example, 40 MHz or 80 MHz) greater than 20 MHz. For another example, the SIG-A information bandwidth indicated by the field used to indicate the SIG-A information bandwidth may be 20 MHz or a PPDU bandwidth. Optionally, the signature symbol field may further include a field used to indicate the PPDU bandwidth.

Alternatively, the field used to indicate the SIG-A information bandwidth may be 2 bits. For example, the SIG-A information bandwidth may be 20 MHz, 40 MHz, 80 MHz, or 160 MHz.

Figure 14:
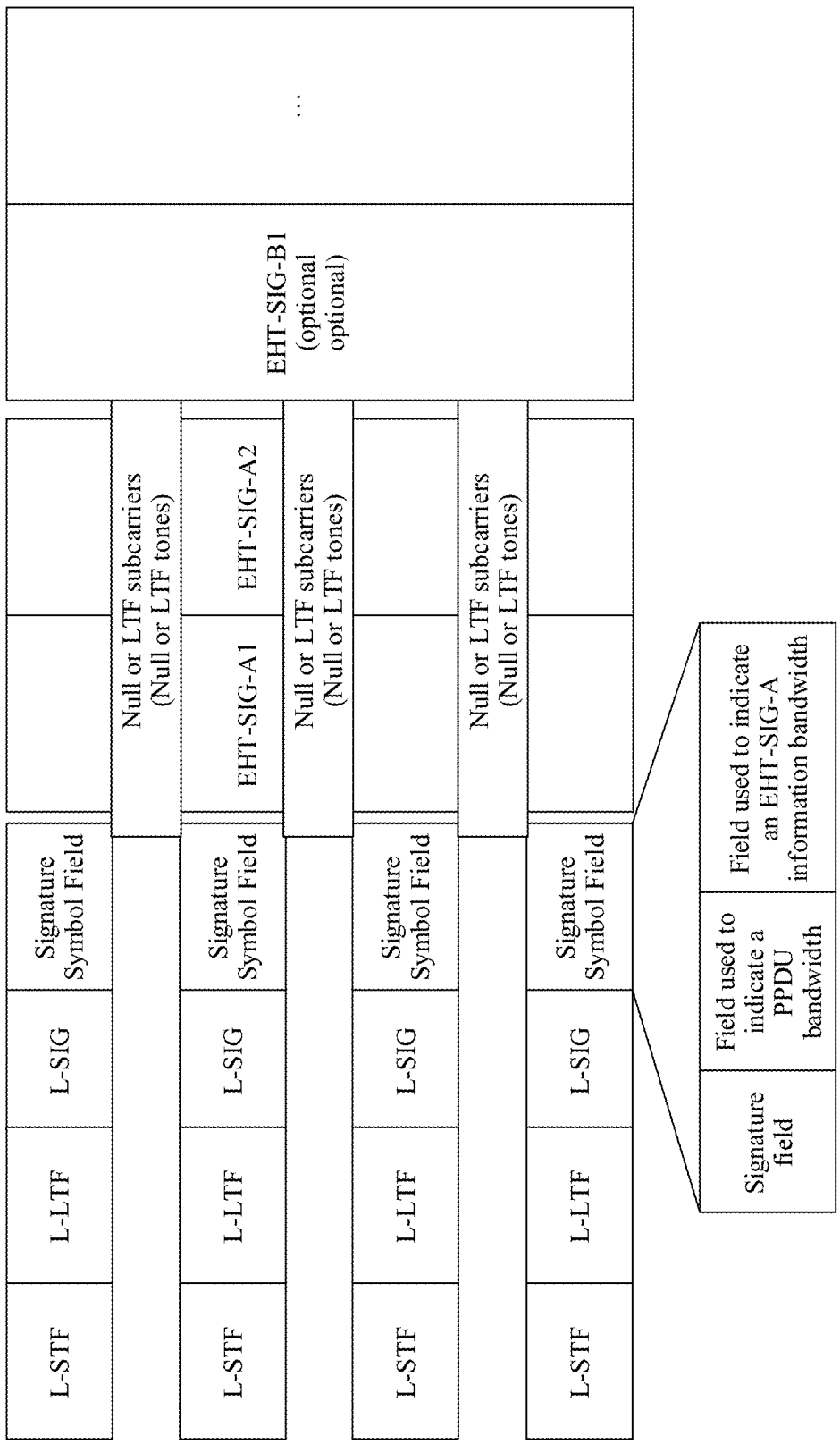
FIG. 14 is a third schematic structural diagram of a PPDU with a variable EHT-SIG-A information bandwidth according to an embodiment of this application.

As shown in FIG. 14, the signature symbol field further includes the field used to indicate the PPDU bandwidth. When the SIG-A information bandwidth is 20 MHz or a fixed information bandwidth greater than 20 MHz, if the fixed information bandwidth greater than 20 MHz is 40 MHz, and the PPDU bandwidth is 20 MHz, the SIG-A information bandwidth indicated by the field used to indicate the SIG-A information bandwidth is 20 MHz. When the PPDU bandwidth is 40 MHz or higher, the SIG-A information bandwidth indicated by the field used to indicate the SIG-A information bandwidth is 20 MHz or 40 MHz. If the fixed information bandwidth greater than 20 MHz is 80 MHz, when the PPDU bandwidth is 20 MHz, the SIG-A information bandwidth indicated by the field used to indicate the SIG-A information bandwidth is 20 MHz. When the PPDU bandwidth is 40 MHz, the SIG-A information bandwidth indicated by the field used to indicate the SIG-A information bandwidth is 20 MHz. When the PPDU bandwidth is 80 MHz or higher, the SIG-A information bandwidth indicated by the field used to indicate the SIG-A information bandwidth is 20 MHz or 80 MHz.

As shown in FIG. 14, the signature symbol field further includes the field used to indicate the PPDU bandwidth. When the SIG-A information bandwidth is 20 MHz or the PPDU bandwidth, the SIG-A information bandwidth indicated by the field used to indicate the SIG-A information bandwidth is 20 MHz or the PPDU bandwidth.

Further, after receiving the PPDU, the receive end reads the signature symbol field, and obtains the SIG-A information bandwidth by using the field that is in the signature symbol field and that is used to indicate the SIG-A information bandwidth. Therefore, in the solution 2, the SIG-A information bandwidth is obtained by using the field that is included in the signature symbol field and that is used to indicate the SIG-A information bandwidth, so that different SIG-A information bandwidths can be flexibly indicated, to increase a number of information bits that can be carried by the SIG-A.

Solution 3: The field used to indicate the SIG-A information bandwidth is a signature symbol field that includes a field used to indicate a bandwidth mode in the PPDU.

If the bandwidth mode indicated by the field used to indicate the bandwidth mode is a punctured bandwidth, the SIG-A information bandwidth is 20 MHz. If the bandwidth mode indicated by the field used to indicate the bandwidth mode is a non-punctured bandwidth, the SIG-A information bandwidth is a fixed information bandwidth greater than 20 MHz or a PPDU bandwidth. Optionally, the signature symbol field may further include a field used to indicate the PPDU bandwidth.

The signature symbol field includes a predetermined sequence known to both the transmit end and the receive end, and the signature symbol field is located after an L-SIG and before the SIG-A.

Further, after receiving the PPDU, the receive end reads the signature symbol field, and obtains the corresponding SIG-A information bandwidth by using the field that is in the signature symbol field and that is used to indicate the bandwidth mode. Therefore, in the solution 3, the SIG-A information bandwidth is obtained by using the field that is included in the signature symbol field and that is used to indicate the SIG-A information bandwidth, so that different SIG-A information bandwidths can be flexibly indicated, to increase a number of information bits that can be carried by the SIG-A.

In addition, when the EHT-SIG-A can accommodate a relatively large number of information bits, a case in which a number of information bits that can be carried is far greater than a number of required information bits may occur. For example, when a number of SIG-A information symbols with an information bandwidth of 160 MHz is the same as a number of SIG-A information symbols with an information bandwidth of 20 MHz, a number of information bits that can be carried by a SIG-A with the information bandwidth of 160 MHz is eight times a number of information bits that can be carried by the SIG-A with the information bandwidth of 20 MHz. If the number of information bits that can be carried is far greater than the number of required information bits, the following manners can be used:

Manner 1: The transmit end repeatedly arranges information bits that need to be transmitted. For example, the information bits that need to be transmitted are b0, b1, . . . , and b25, and a number of information bits that can be carried is four times a number of the 26 bits, that is, 104. Therefore, the information bits may be carried by four groups of b0, b1, . . . , and b25.

Manner 2: A redundant bit is set as a reserved bit for use in a subsequent design.

Manner 3: A redundant bit is set as a padding bit. For the padding bit, a bit sequence, for example, a bit sequence of 010101 . . . , may be defined in advance, or a bit sequence may not be defined in advance but is determined by the transmit end.

Manner 4: Information in a SIG-B corresponding to a SIG-A with a lower information bandwidth is carried in a SIG-A with a higher information bandwidth in advance. If the information in the SIG-B has been transmitted, the SIG-B does not need to be transmitted. If there is still information that is not transmitted, the SIG-B further carries the information that is not transmitted. Optionally, a number of SIG-B symbols that are not transmitted may be indicated in the SIG-A with a higher information bandwidth.

In the foregoing embodiments provided in this application, the solutions provided in the embodiments of this application are described separately from a perspective of each device and from a perspective of interaction between devices. It may be understood that, to implement the foregoing functions, the devices such as the transmit end and the receive end include a corresponding hardware structure and/or a software module for performing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

Figure 15:
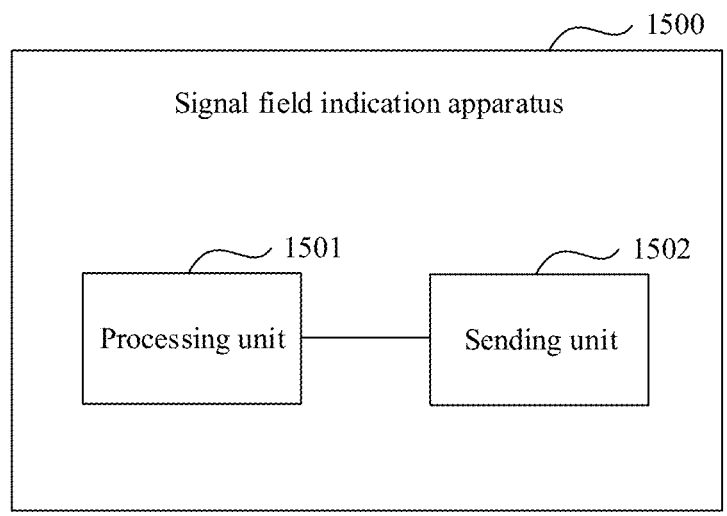
FIG. 15 is a first schematic structural diagram of a signal field indication apparatus according to an embodiment of this application.

For example, based on the foregoing embodiment, an embodiment of this application provides a signal field indication apparatus 1500, configured to perform an operation of a transmit end. As shown in FIG. 15, the apparatus 1500 includes:

a processing unit 1501, configured to generate a PPDU, where the PPDU includes a signal field SIG-A indication field, and the SIG-A indication field includes at least one of a field used to indicate a number of SIG-A information symbols and a field used to indicate a SIG-A information bandwidth; and a sending unit 1502, configured to send the PPDU.

It should be understood that the signal field indication apparatus in this embodiment has any function of the transmit end in the foregoing method. For any function, refer to the record in the foregoing method. Details are not described herein again.

Figure 16:
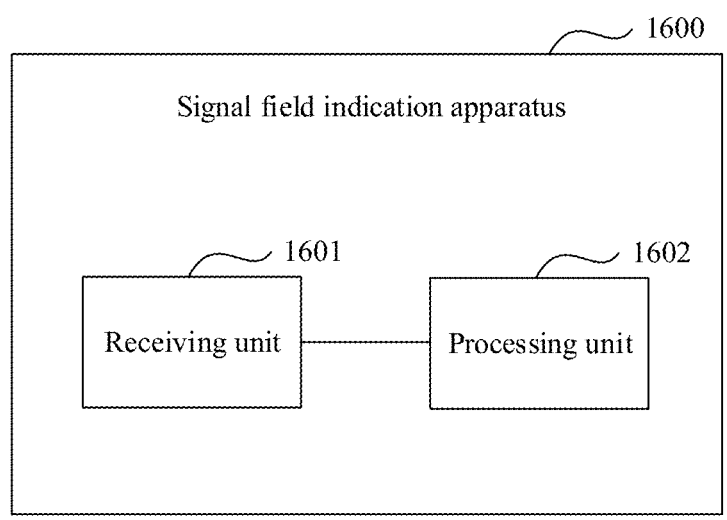
FIG. 16 is a second schematic structural diagram of a signal field indication apparatus according to an embodiment of this application.

For another example, based on the foregoing embodiment, an embodiment of this application provides a signal field indication apparatus 1600, configured to perform an operation of a receive end. As shown in FIG. 16, the apparatus 1600 includes:

a receiving unit 1601, configured to receive a PPDU, where the PPDU includes a SIG-A indication field, and the SIG-A indication field includes at least one of a field used to indicate a number of SIG-A information symbols and a field used to indicate a SIG-A information bandwidth; and a processing unit 1602, configured to: read the SIG-A indication field to learn of at least one of the number of SIG-A information symbols and the SIG-A information bandwidth, and read a SIG-A based on at least one of the number of SIG-A information symbols and the SIG-A information bandwidth.

It should be understood that the signal field indication apparatus in this embodiment has any function of the receive end in the foregoing method. For any function, refer to the record in the foregoing method. Details are not described herein again.

Figure 17:
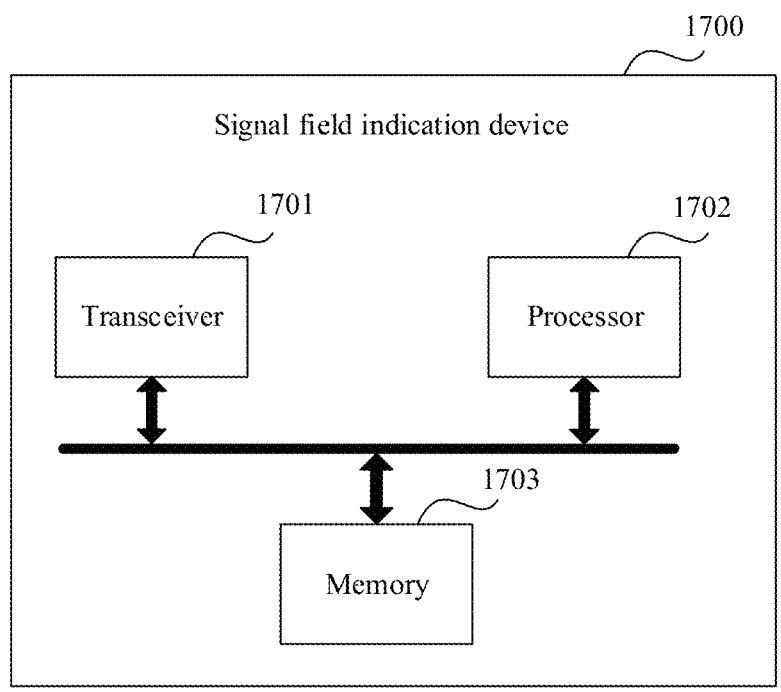
FIG. 17 is a schematic structural diagram of a signal field indication device according to an embodiment of this application.

Based on the foregoing embodiments, an embodiment of this application further provides a signal field indication device 1700. Referring to FIG. 17, the device 1700 includes a transceiver 1701, a processor 1702, and a memory 1703. The processor may be a CPU, a network processor (NP), a hardware chip, or any combination thereof. The memory may include a volatile memory, for example, a random access memory (RAM). Alternatively, the memory may include a non-volatile memory, such as a read-only memory (ROM), a flash memory, a hard disk drive (HDD), or a solid-state drive (SSD). Alternatively, the memory may include a combination of the foregoing types of memories.

When the device is a transmit end, the memory 1703 is configured to store a computer program. The processor 1702 invokes the computer program stored in the memory 1703, and performs, by using the transceiver 1701, the method performed by the transmit end in the foregoing embodiment. When the device is a receive end, the memory 1703 is configured to store a computer program. The processor 1702 invokes the computer program stored in the memory 1703, and performs, by using the transceiver 1701, the method performed by the receive end in the foregoing embodiment.

It may be understood that the apparatus in the embodiment shown in FIG. 15 may be implemented by the device 1700 shown in FIG. 17. Specifically, the processing unit 1501 may be implemented by the processor 1702, and the sending unit 1502 may be implemented by the transceiver 1701. The apparatus in the embodiment shown in FIG. 16 may be implemented by the device 1700 shown in FIG. 17. Specifically, the processing unit 1602 may be implemented by the processor 1702, and the receiving unit 1601 may be implemented by the transceiver 1701.

An embodiment of this application further provides a computer-readable storage medium. The computer-readable storage medium stores a computer program, and when the computer program is run on a computer, the computer is enabled to perform the methods in the embodiments.

In conclusion, according to the signal field indication method provided in the embodiments of this application, the transmit end generates a PPDU, where the PPDU includes a signal field SIG-A indication field, and the SIG-A indication field includes at least one of a field used to indicate a number of SIG-A information symbols and a field used to indicate a SIG-A information bandwidth; and the transmit end sends the PPDU. According to the method in this application, different numbers of SIG-A information symbols and/or different SIG-A information bandwidths can be flexibly indicated, so that a SIG-A can be used to transmit more information bits, and a balance among information precision, a number of supported functions, and signal overheads can be made.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, and an optical memory) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing the specific function in one or more processes in the flowcharts and/or in one or more blocks in the block diagrams.

It is clear that a person skilled in the art can make various modifications and variations to the embodiments of this application without departing from the scope of this application. In this way, this application is intended to cover these modifications and variations made to the embodiments of this application provided that they fall within the scope of the claims of this application and their equivalent technologies.

What is claimed is:

1. A method, comprising:
receiving a physical layer protocol data unit (PPDU), wherein the PPDU comprises a signal field comprising a first field indicating a number of extremely high throughput (EHT)-signal (SIG)-A (EHT-SIG-A) symbols and a second field indicating the PPDU is an EHT PPDU; and
reading the signal field.

2. The method according to claim 1, wherein the signal field is located after a legacy signal (L-SIG) field and before a EHT-SIG-A field in the PPDU.

3. The method according to claim 1, wherein the signal field further comprises a third field indicating a modulation and coding scheme (MCS) of an EHT-SIG-A field.

4. The method according to claim 1, wherein the first field indicating the number of EHT-SIG-A symbols is an additional symbol indication field comprised in first X1 symbols of an EHT-SIG-A field of the PPDU; and
wherein the additional symbol indication field indicates a difference $\Delta X$ between the number of EHT-SIG-A symbols and X1, a number of values of $\Delta X$ is K, and the K values of $\Delta X$ are in a one-to-one correspondence with K numbers of EHT-SIG-A symbols, wherein when $\Delta X=0$, the number of EHT-SIG-A symbols is X1, and when $\Delta X$ is a positive integer, the number of EHT-SIG-A symbols is X1+$\Delta X$, and both X1 and K are positive integers.

5. The method according to claim 1, wherein when the number of EHT-SIG-A symbols is X1+$\Delta X$, first X1 symbols of an EHT-SIG-A field comprise an additional symbol indication field, a first cyclic redundancy code (CRC), and a first tail bit, the first CRC is used to check whether the first X1 symbols are accurate, and the first tail bit is used by a receive end to terminate decoding of the first X1 symbols; remaining $\Delta X$ symbols of the EHT-SIG-A field comprise a second CRC and a second tail bit; and the second CRC is used to check whether the $\Delta X$ symbols are accurate, and the second tail bit is used by the receive end to terminate decoding of the EHT-SIG-A field.

6. The method according to claim 1, wherein the signal field further comprises a cyclic redundancy code (CRC) field.

7. The method according to claim 1, wherein an EHT-SIG-A field of the PPDU is transmitted in a basic unit of 80 MHz.

8. An apparatus, comprising:
a memory storing program instructions that are executable by at least one processor; and
the at least one processor coupled to the memory, the at least one processor being configured to execute the instructions to:
receive a physical layer protocol data unit (PPDU), wherein the PPDU comprises a signal field comprising a first field indicating a number of extremely high throughput (EHT)-signal (SIG)-A (EHT-SIG-A) symbols and a second field indicating the PPDU is an EHT PPDU; and
read the signal field.

9. The apparatus according to claim 8, wherein the signal field is located after a legacy signal field (L-SIG) field and before an EHT-SIG-A field in the PPDU.

10. The apparatus according to claim 8, wherein the signal field further comprises a third field indicating a modulation and coding scheme (MCS) of an EHT-SIG-A field.

11. The apparatus according to claim 8, wherein the first field indicating the number of the EHT-SIG-A symbols is an additional symbol indication field comprised in first X1 symbols of an EHT-SIG-A field of the PPDU; and
wherein the additional symbol indication field indicates a difference $\Delta X$ between the number of the EHT-SIG-A symbols and X1, $\Delta X$ has a value in K values, and the K values are in a one-to-one correspondence with K numbers of EHT-SIG-A symbols, wherein when $\Delta X=0$, $\Delta X$ corresponds to X1 EHT-SIG-A symbols, and when $\Delta X$ is a positive integer, $\Delta X$ corresponds to X1+$\Delta X$ EHT-SIG-A symbols, and both X1 and K are positive integers.

12. The apparatus according to claim 8, wherein when the number of the EHT-SIG-A symbols is X1+$\Delta X$, a first X1 symbols of an EHT-SIG-A field comprise an additional symbol indication field, a first cyclic redundancy code (CRC), and a first tail bit, the first CRC is used to check whether the first X1 symbols are accurate, and the first tail bit is used by a receive end to terminate decoding of the first X1 symbols; remaining $\Delta X$ symbols of the EHT-SIG-A field comprise a second CRC and a second tail bit; and the second CRC is used to check whether the $\Delta X$ symbols are accurate, and the second tail bit is used by the receive end to terminate decoding of the EHT-SIG-A field.

13. The apparatus according to claim 8, wherein the signal field further comprises a cyclic redundancy code (CRC) field.

14. The apparatus according to claim 8, wherein an EHT-SIG-A field of the PPDU is transmitted in a basic unit of 80 MHz.

15. A non-transitory computer-readable media storing computer instructions that when executed by one or more processors, cause an apparatus to perform steps of:
receiving a physical layer protocol data unit (PPDU), wherein the PPDU comprises a signal field comprising a first field indicating a number of extremely high throughput (EHT)-signal (SIG)-A (EHT-SIG-A) symbols and a second field indicating the PPDU is an EHT PPDU; and
reading the signal field.

16. The non-transitory computer-readable media according to claim 15, wherein the signal field is located after a legacy signal field (L-SIG) field and before an EHT-SIG-A field in the PPDU.

17. The non-transitory computer-readable media according to claim 15, wherein the signal field further comprises a third field indicating a modulation and coding scheme (MCS) of an EHT-SIG-A field.

18. The non-transitory computer-readable media according to claim 15, wherein the first field indicating the number of the EHT-SIG-A symbols is an additional symbol indication field comprised in first X1 symbols of an EHT-SIG-A field of the PPDU; and
wherein the additional symbol indication field indicates a difference $\Delta X$ between the number of the EHT-SIG-A symbols and X1, $\Delta X$ has a value in K values, and the K values are in a one-to-one correspondence with K numbers of EHT-SIG-A symbols, wherein when $\Delta X=0$, $\Delta X$ corresponds to X1 EHT-SIG-A symbols, and when $\Delta X$ is a positive integer, $\Delta X$ corresponds to X1+$\Delta X$ EHT-SIG-A symbols, and both X1 and K are positive integers.

19. The non-transitory computer-readable media according to claim 15, wherein the signal field further comprises a cyclic redundancy code (CRC) field.

20. The non-transitory computer-readable media according to claim 15, wherein an EHT-SIG-A field of the PPDU is transmitted in a basic unit of 80 MHz.

* * * * *

UNITED STATES PATENT AND TRADEMARK OFFICE
CERTIFICATE OF CORRECTION

PATENT NO. : 12,301,505 B2  
APPLICATION NO. : 18/658311  
DATED : May 13, 2025  
INVENTOR(S) : Yu et al.

Page 1 of 1

It is certified that error appears in the above-identified patent and that said Letters Patent is hereby corrected as shown below:

In the Specification

In Column 8, Line 62, delete " ⌊ ⌋ " and insert -- [ ] --.

Signed and Sealed this  
First Day of July, 2025

Coke Morgan Stewart  
*Acting Director of the United States Patent and Trademark Office*